United States Patent [19]

Cooper et al.

[11] Patent Number: 4,902,487

[45] Date of Patent: Feb. 20, 1990

[54] TREATMENT OF DIESEL EXHAUST GASES

[75] Inventors: Barry J. Cooper, Radnor; Hyun J. Jung, Wayne; James E. Thoss, West Chester, all of Pa.

[73] Assignee: Johnson Matthey, Inc., Valley Forge, Pa.

[21] Appl. No.: 193,529

[22] Filed: May 13, 1988

[51] Int. Cl.⁴ .............................................. B01D 53/34
[52] U.S. Cl. .................................................. 423/215.5
[58] Field of Search ...................... 422/171; 423/213.2, 423/213.5, 213.7, 215.5

[56] References Cited

U.S. PATENT DOCUMENTS

| | | | |
|---|---|---|---|
| 4,303,552 | 12/1981 | Ernest et al. | 423/213.5 |
| 4,451,441 | 5/1984 | Ernest et al. | 423/215.5 |
| 4,516,990 | 5/1985 | Erdmannsdoerfer et al. | 423/215.5 |
| 4,670,233 | 6/1987 | Erdmannsdoerfer et al. | 423/215.5 |
| 4,759,918 | 7/1988 | Homeier et al. | 423/213.5 |

FOREIGN PATENT DOCUMENTS

| | | | |
|---|---|---|---|
| 1014498 | 12/1965 | United Kingdom | 423/213.2 |
| 2188559 | 10/1987 | United Kingdom | 423/213.7 |

*Primary Examiner*—Jeffrey E. Russel
*Attorney, Agent, or Firm*—Cushman, Darby & Cushman

[57] ABSTRACT

In a process wherein diesel exhaust gas is passed through a filter to remove particulate therefrom before discharge and particulate deposited on the filter is combusted, the improvement which comprises combusting the particulate with a gas containing $NO_2$, which may be catalytically generated in the exhaust system.

9 Claims, 5 Drawing Sheets

TREATMENT OF DIESEL EXHAUST GASES

The present invention is concerned with certain improvements in the removal of particulate from diesel exhaust gases.

BACKGROUND

It is conventional in the art to pass exhaust gases from diesel engines through a filter to remove particulate (soot or other carbonaceous solids) in the gas before the gas is discharged into the atmosphere. This is generally accomplished by providing a filter, e.g., stainless steel wire mesh, which usually includes a catalyst, the purpose of the catalyst being to facilitate combustion of the particles which are collected on the filter. Such combustion is desirable to avoid filter plugging and the buildup of undesirable back pressure as a result of the collection of soot or like particulate on the filter.

Prior art filter systems have suffered from a number of disadvantages. Thus, for example, with currently available systems, there is a problem of effective combustion of diesel particulate at normal gas temperatures of 300° C. or below. While the temperature of diesel exhaust gas may be as high as 500° C., it is generally considerably lower, e.g., 300° C. or below, and, as noted, conventional filter arrangements are not particularly effective for combusting particulate at such low temperatures. Means may be provided to increase the temperature of the exhaust gas to above 300° C. to facilitate combustion of the collected particulate but this creates other difficulties. Additionally, prior arrangements have suffered from the substantial generation of sulphuric acid which in turn condenses to form undesired sulphate particulate.

The principal object of the invention is to provide a method for effective combustion and removal of diesel particulate collected on the filter even at low temperatures, e.g., 225°–300° C. Another object is to minimize the formation of sulphuric acid and sulphate particulate. Other objects will also be hereinafter apparent.

BROAD DESCRIPTION OF THE INVENTION

Broadly state, the invention contemplates contacting particulate entrapped on the filter with $NO_2$ gas so as to cause combustion of the particulate and its consequent removal from the filter. The $NO_2$ required for this purpose is catalytically generated in the exhaust gas itself before it is passed downstream to the filter on which diesel particulate is entrapped, the $NO_2$ oxidant serving to effectively combust the collected particulate at low temperature and thus reduce the back pressure normally caused by particulate deposition on the filter. It is particularly useful to use the $NO_2$ gas in combination with $H_2O$ vapor as this combination appears to provide especially effective results.

DETAILED DESCRIPTION OF THE INVENTION

Figure 1:
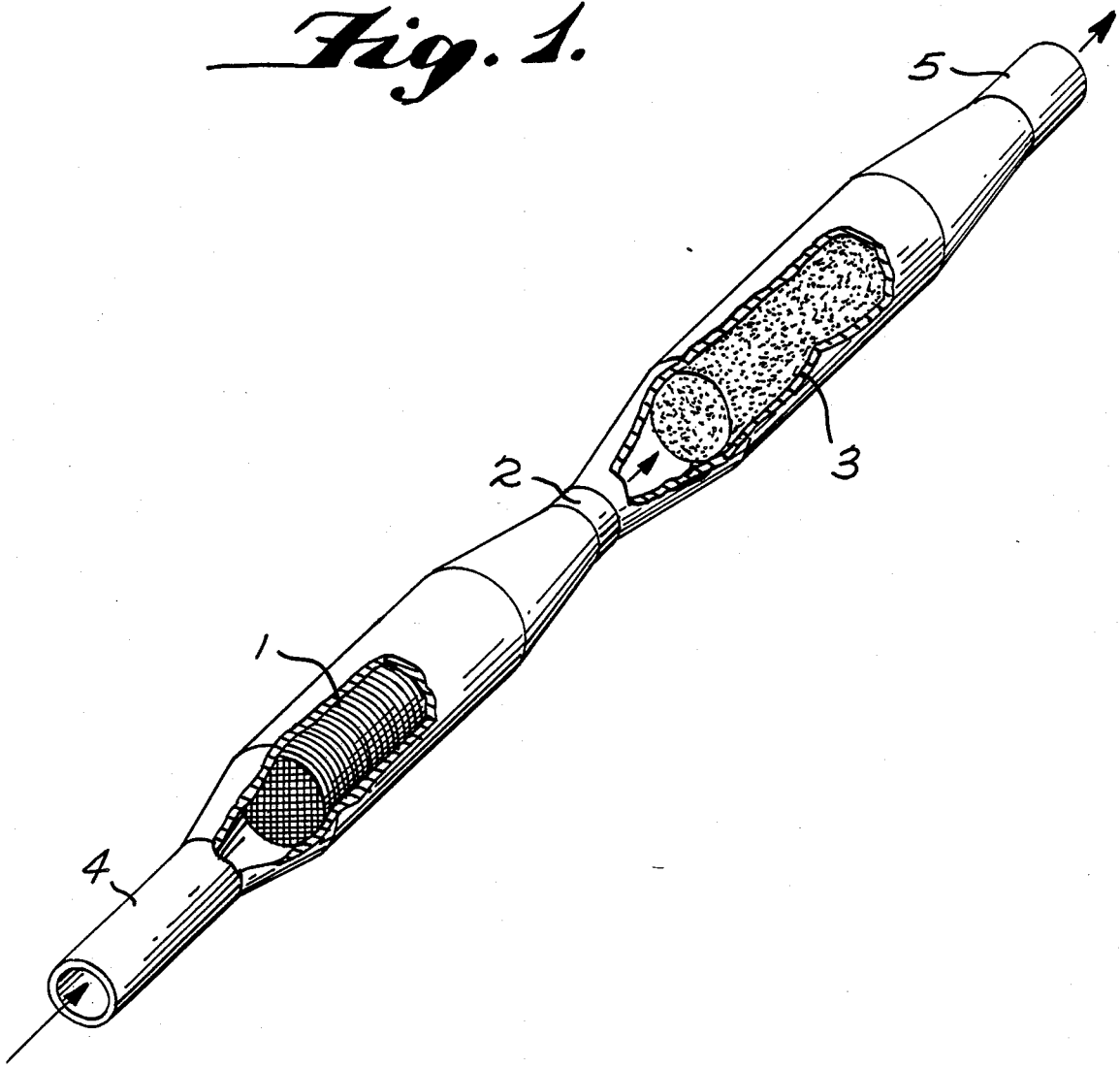
FIG. 1 is a perspective view with parts broken away illustrating one embodiment of the invention while FIGS. 2–4 graphically illustrate advantages of the invention.

The $NO_2$ oxidant gas used to combust particulate on the filter may be catalytically generated in a variety of ways. However, this is preferably accomplished by initially passing the diesel exhaust gas through a catalytic converter position upstream of the filter. The exhaust gas usually includes a significant amount of NO, $O_2$, CO, $CO_2$, $H_2O$ and $SO_2$ as well as unburnt hydrocarbons and carbonaceous particulate. The important component, however, is the NO which, according to the invention, is converted to the $NO_2$ oxidant necessary to combust particulate on the filter. Preferably, the amount of $NO_2$ in the gas as it is fed to the filter will be in the range 100–2000 ppm although it will be appreciated that the $NO_2$ content can be widely varied within and outside this range. The essential point is that there is enough $NO_2$ in the gas fed to the filter to effectively combust the deposited carbon soots and like particulates.

In a preferred embodiment, the diesel exhaust gas is passed through a low pressure drop monolith catalyst (e.g., a ceramic honeycomb) coated with platinum (Pt) or other platinum group metal (PGM) whereby NO in the exhaust gas is catalytically converted to $NO_2$ by reaction with oxygen. The thus treated gas is then passed downstream through a wire mesh particulate filter which, if desired, contains a catalyst. This catalyst may simply comprise a conventional alumina washcoat. Alternatively, base metal catalysts may be used. Particularly useful results are obtained if the filter includes a high temperature particulate combustion catalyst, typically a catalyst comprising lanthanum, cesium and vanadium pentoxide ($La/Cs/V_2O_5$) or the like, to combust particulate collected on the filter.

It is to be understood that the catalytically generated oxidant is no necessarily all $NO_2$. It may be, in whole part $N_2O_5$, $N_2O$ or equivalent oxidant derived from NO in the diesel exhaust. For ease of reference, however, the oxidant is simply referred to herein as $NO_2$. This gas apparently functions to combust the soot particulate on the filter according to the following reactions:

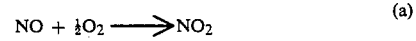
(a)

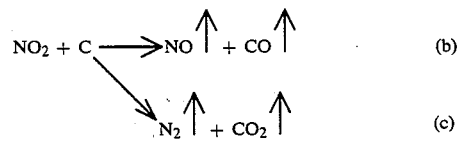
(b)

(c)

It is to be noted that the combination of reactions (a) and (c) provide for the removal of NO from the diesel exhaust as well as providing the $NO_2$ needed for soot removal.

As noted earlier, particularly useful results are realized if the combustion is carried out in the presence of small amounts of added water (e.g., 0.5% to 10%, based on the total volume of the gas). It is believed that the water may convert some of the $NO_2$ to $HNO_3$ which also appears to facilitate combustion or removal of the particulate from the filter.

The invention is based on the theory that if small amounts of $NO_2$ and/or $HNO_3$ can be provided in the diesel exhaust gas prior to the diesel particulate filter, the $NO_2$ and/or $HNO_3$ will be absorbed into the filter carbon deposits, which are then ignited, and removed as harmless $N_2$ and $H_2O$ more effectively and at lower temperatures than might otherwise be the case.

Known catalysts for producing $NO_2$ from NO and $O_2$ may be used to generate the $NO_2$ oxidant for present purposes Such catalysts are extensively used in the catalytic conversion of automotive exhaust gases. This includes, for example, Pt, Pd, Ru, Rh or combinations thereof, platinum group metal oxides such as $RhO_3$ and the like. support, e.g., a ceramic honeycomb. However, the catalyst may also be used in bead or particulate form.

The filter may be in conventional form and structure. Typically this comprises one or more wire meshes of appropriate metal (e.g., stainless steel or the like) through which the gas is passed. As noted earlier, the mesh or equivalent may include a coating, such as alumina, which facilitates entrapment of the particulates or a coating which facilitates higher temperature combustion, e.g., vanadium oxide or preferably $La/Cs/V_2O_5$. It will be appreciated, however, that the invention is not dependent on the use of a wire mesh filter, and that other available particulate filter alternatives, e.g., a ceramic wall flow filter, or a ceramic foam filter, may be used.

According to a preferred way of carrying out the invention, diesel exhaust is passed through a low pressure drop platinum coated monolith catalyst (ceramic honeycomb) containing a catalytically effective amount of platinum at a space velocity of, for example, up to about 60,000 to generate $NO_2$ from the combination of NO and $O_2$ in the exhaust gas. The thus processed gas is then passed through a conventional wire mesh diesel particulate filter containing an alumina wash-coat or a particulate combustion catalyst, preferably $La/Cs/V_2O_5$, located downstream of the monolith. The gas passing through the filter serves to effectively combust soot or like carbonaceous particles deposited on the filter.

Space velocity of the gas through the $NO_2$-forming catalyst and through the filter can be widely varied depending on other operating conditions, e.g., the nature of the catalyst. Generally speaking, however, space velocities of up to 200,000 per hour may be used to form the $NO_2$ while space velocities of up to 100,000 per hour are used through the filter.

The system may be arranged so that the oxidant generation step functions continuously during operation of the engine or functions only periodically as soot accumulates beyond a desired point on the filter. An appropriate arrangement for by-passing the $NO_2$ generating catalyst may be provided if the oxidant generation step is to be performed only periodically. This may be desirable in the case where more sulphate is being formed than is desirable.

The invention is illustrated in the accompanying drawing wherein the numeral (1) generally represents a ceramic honeycomb monolith of conventional composition, the cells of which may be coated with an alumina washcoat carrying, for example, a Pt catalyst. Connected to receive gas exiting from (1) via connecting passage (2) is a particulate filter or trap (3) of conventional design. The surfaces of (3) which contact gas may carry an appropriate catalyst as noted earlier. A base metal catalyst is usually preferred for this purpose, particularly one which is a sulfur- or sulfate-absorbing type of catalyst.

In use, diesel exhaust enters the system through the inlet (4), is processed in (1) to catalytically generate $NO_2$ from NO therein, the resulting gas with the enriched $NO_2$ content being then fed through filter (3) after which it is discharged at (5). In filter (3), soot or like carbonaceous particulate is combusted at a temperature generally in the order of 250°–400° C., or even higher if desired, to convert carbon deposits to volatile CO and/or $CO_2$. The filter also effectively serves to trap any $H_2SO_4$ or sulfate generated in the system.

There may be sufficient water vapor in the gas being processed in (1) to provide the desired amount of $H_2O$ to improve combustion at the filter. However, water may be added at (1) or at some point before the gas enters the filter (3).

The invention is illustrated, but not limited, by the following examples.

EXAMPLE 1

The following series of experiments were run to determine the effect of various gases on the low temperature ($<400°$ C.) gas phase oxidation of soot collected on a diesel particulate trap. Previous testing had shown that oxygen alone was not effective at temperatures below 400° C.

The tests were run using a laboratory flow (SCAT-Synthetic Catalyst Activity Test) rig. This system is used to blend a synthetic exhaust gas using pure component compressed gases and is capable of analyzing the resulting gas mixture before and after it is passed through a small experimental catalyst sample.

For these experiments, two elements were installed in the SCAT flow reactor system. The first element was a conventional ceramic monolith supported catalyst containing approximately 80 gm/ft$^3$ Pt. The monolith core was 1" in diameter and 2.23" long which using a 20 l/min flow stream, provided a space velocity of approximately 42,000 $HR^{-1}$.

The second element, placed approximately 1" downstream of the monolith, was a 1" diameter by 1" long wire mesh plug. The plugs so used were fabricated from the same stainless steel mesh used for full size blocks, and were coated with a conventional dumina washcoat. No precious metal or any other catalyst was applied to these plugs. Soot was deposited on these plugs by installing them in a special fixture which was then mounted in the exhaust system of an automotive diesel engine running in a dynamometer test cell.

The SCAT flow reactor, containing the platinum monolith followed by a heavily sooted plug, was then heated to 300° C. in a flowing nitrogen stream. Differential pressure across the plug (measured in inches of water) was used as a measure of soot loading on the plug and the rate of reduction in this differential pressure (in inches of $H_2O$ per hour) was used as an indicator of the rate of burning of the trapped particulate.

Numerous combinations of gases were then introduced to the flow reactor and the rate of pressure drop decrease was measured. The concentration of each gas (indicated below) was held constant throughout this series of tests:

| | |
|---|---|
| Oxygen | 12% |
| Water | 4.5% |
| Carbon Monoxide | 200 ppm |
| Nitric Oxide | 400 ppm |
| Sulfur Dioxide | 50 ppm |
| Nitrogen | Balance |

Three series of tests were run designated as SCAT run numbers 6797, 6802 and 6803. The results of these tests are shown in Tables 1, 2 and 3.

TABLE 1

RUN #6797

| TEST # | N2 BALANCE | NO 400 ppm | O2 12% | H2O 4.5% | SO2 50 ppm | CO 200 ppm | "H2O START | "H2O/HR. |
|---|---|---|---|---|---|---|---|---|
| 1 | X | | | | | | 94 | 0 |
| 2 | X | X | | | | | 93 | 10 |
| 3 | X | X | X | | | | 87 | 32 |
| 4 | X | X | | | | | 77 | 0 |
| 5 | X | X | X | | | | 75 | 30 |
| 6 | X | X | X | X | | | 68 | 64 |
| 7 | X | X | X | X | | | 59 | 28 |
| 8 | X | | | X | | | 53 | 4 |
| 9 | X | X | | X | | | 51 | 0 |
| 10 | X | | X | X | | | 34 | 0 |
| 11 | X | X | X | X | X | | 35 | 16 |
| 12 | X | X | X | X | | | 31 | 16 |
| 13 | X | | | | | | 29 | 0 |
| 14 | X | X | | | X | | 28 | 0 |
| 15 | X | | | X | X | | 28 | 0 |
| 16 | X | X | | X | X | | 29 | 2 |
| 17 | X | | X | | X | | 27 | 5 |
| 18 | X | X | X | X | X | X | 27 | 17 |

TABLE 2

SCAT RUN #6802

| TEST # | N2 BALANCE | SO2 50 ppm | O2 12% | H2O 4.5% | NO 400 ppm | "H2O START | "H2O/HR. |
|---|---|---|---|---|---|---|---|
| 1 | X | | | | | 79 | 0 |
| 2 | X | X | | | | 79 | 4 |
| 3 | X | X | X | | | 76 | 4 |
| 4 | X | X | X | X | | 74 | 4 |
| 5 | X | X | | X | | 78 | 0 |
| 6 | X | X | | X | X | 78 | 0 |
| 7 | X | X | X | X | X | 69 | 53 |
| 8 | X | X | X | | X | 60 | 51 |
| 9 | X | X | | | X | 48 | 4 |
| 10 | X | X | X | | | 43 | 0 |

TABLE 3

SCAT RUN #6803

| TEST | N2 BALANCE | NO 400 ppm | O2 12% | H2O 4.5% | SO2 50 ppm | "H2O START | "H2O/HR |
|---|---|---|---|---|---|---|---|
| 1 | X | X | | | | 72 | 0 |
| 2 | X | | X | | | 69 | 0 |
| 3 | X | X | X | | | 69 | 24 |
| 4 | X | X | X | X | | 58 | 49 |
| 5 | X | X | X | X | X | 46 | 30 |
| 6 | X | X | X | X | | 35 | 20 |
| 7 | X | X | | X | | 32 | 0 |
| 8 | X | X | X | X | | 31 | 11 |

It will be appreciated that the differential pressure across the filter as shown in the second column from the right in Tables 1–3 represents the starting pressure drop across the filter. The right-hand column in Tables 1–3 headed "Rate" shows the reduction in pressure drop resulting from use of the indicated gases. The greater the reduction value shown in this column, the greater the combusting effect of the gas used.

The following conclusions can be drawn on the basis of the results obtained in the foregoing tests:

1. oxygen alone is incapable of oxidizing the trapped particulate at a significant rate at 300° C.;
2. a combination of nitric oxide and oxygen passed over the Pt catalyst produces a gas phase oxidant (presumably NO2) which is an effective particulate oxidant at 300° C.;
3. the addition of water (along with NO2 and O2) substantially enhances the rate of pressure drop reduction;
4. the rate of combustion of the particulate, as indicated by the rate of pressure change, decreases as the particulate loading decreases.

EXAMPLE 2

Example 1 was repeated with the following changes:
1. pure NO2 was introduced into the gas;
2. oxygen was provided from one of two alternate sources:
   a. standard plant compressed air containing approximately 0.3% water; or
   b. zero grade air from a commercial compressed gas cylinder containing less than 3 ppm water.
3. only non-catalyzed plugs with deposited diesel soot were used, i.e., the platinum monolith catalyst used in Example 1 was not employed in two of the tests (designated as 7169 and 7174) of the present example. One experiment (7176) was conducted with a Pt monolith upstream of the particulate filter, and used NO rather than NO2 in the gas stream.

Three series of tests were run designated as SCAT run numbers 7169, 7174 and 7176. The results of these tests are given in Tables 4, 5 and 6. The rate of decrease in differential pressure was enhanced by the addition of oxygen (plant air) to the $NO_2$ in the first series of tests (#7169). This indicates that water played a key role in the $NO_2$/soot reaction.

The second series of tests were designed to delay the introduction of water into the system. It is considered that the higher rate observed for the $NO_2$ only reaction in the first series of tests (36' $H_2O$/hr) compared with the lower rate of 13" $H_2O$/hr measured in the second series was caused by residual water in the system during the first series of tests. The effect of water was confirmed in the third series of tests where the Pt monolith was used to make $NO_2$ by reaction of NO and oxygen, the reaction being promoted by the water content of the oxygen feed stream.

TABLE 4

| | SCAT RUN #7169 | | | | | |
|---|---|---|---|---|---|---|
| TEST # | $N_2$ BALANCE | $NO_2$ 400 ppm | NO 400 ppm | $O_2$ 12% | $H_2O$ 4.5% | RATE "$H_2O$/ HR |
| 1 | X | | | | | 0 |
| 2 | X | | | X | | 0 |
| 3 | X | | X | | | 0 |
| 4 | X | | | | X | 0 |
| 5 | X | | X | X | X | 0 |
| 6 | X | X | | | | 32 |
| 7 | X | X | | X | | 40 |
| 8 | X | X | X | | | 8 |

TABLE 5

| | SCAT Run #7174 | | | | | |
|---|---|---|---|---|---|---|
| TEST # | $N_2$ BALANCE | $NO_2$ 400 ppm | $O_2$ 12% | NO 400 ppm | $H_2O$ 4.5% | RATE "$H_2O$/ HR |
| 1 | X | X | | | | 13 |
| 2 | X | X | X | | | 32 |
| 3 | X | X | X | X | | 19 |
| 4 | X | X | | X | | 5 |
| 5 | X | X | | X | | 10 |
| 6 | X | X | X | X | | 50 |
| 7 | X | X | | | X | 60 |
| 8 | X | X | | X | X | 23 |
| 9 | X | X | X | | X | 75 |
| 10 | X | X | X | X | X | 24 |

TABLE 6

| | Pt Monolith Upstream of an Alumina Coated Filter SCAT RUN 7176 | | | | | |
|---|---|---|---|---|---|---|
| TEST # | $N_2$ BALANCE | NO 400 ppm | ZERO AIR (<3 ppm $H_2O$) | PLANT AIR (0.3% $H_2O$) | $H_2O$ 4.5% | RATE "$H_2O$/HR |
| 1 | X | X | X | | | 12 |
| 2 | X | X | | X | | 24 |
| 3 | X | X | | X | X | 42 |

Conclusions which can be reached from the foregoing results include the following:

1. $NO_2$ alone is not necessarily sufficient to cause a significant decrease in pressure drop;
2. water and nitrogen dioxide together cause a rapid drop in pressure;
3 nitric oxide (NO) inhibits the $NO_2$/$H_2O$/soot reaction.

EXAMPLE 3

The purpose of the test described in this example was to demonstrate that a platinum catalyst supported on a ceramic monolith upstream of the uncatalyzed diesel filter is capable of significantly reducing the balance temperature of an uncatalyzed particulate filter.

The balance temperature for diesel particulate combustion is defined within the context of a fixed engine test procedure as the temperature at which the pressure differential across a trap stops increasing. That is, the rate of particulate oxidation balances the rate of particulate accumulation on the filter system. Below the balance temperature, pressure drop increases across the filter and above the balance temperature, pressure drop decreases as the particulate burns.

The diesel filter component of the two systems tested was identical. Each was comprised of six standard wire mesh blocks coated with an alumina washcoat only with no catalyst of any kind. The first system was the uncatalyzed trap alone. The second system was made up of an identical uncatalyzed trap preceded by a catalytic converter containing three 45 in³ ceramic monolith bricks each containing approximately 2 grams of platinum.

These systems were tested on a 2.5 liter Peugeot diesel engine mounted in a dynamometer test cell. Standard balance tests were run by holding engine speed constant and gradually increasing the exhaust gas temperature (4° C./minute) by increasing the engine load. Differential pressure across the filter was recorded as a function of the trap inlet temperature using an X-Y recorder.

Figure 2:
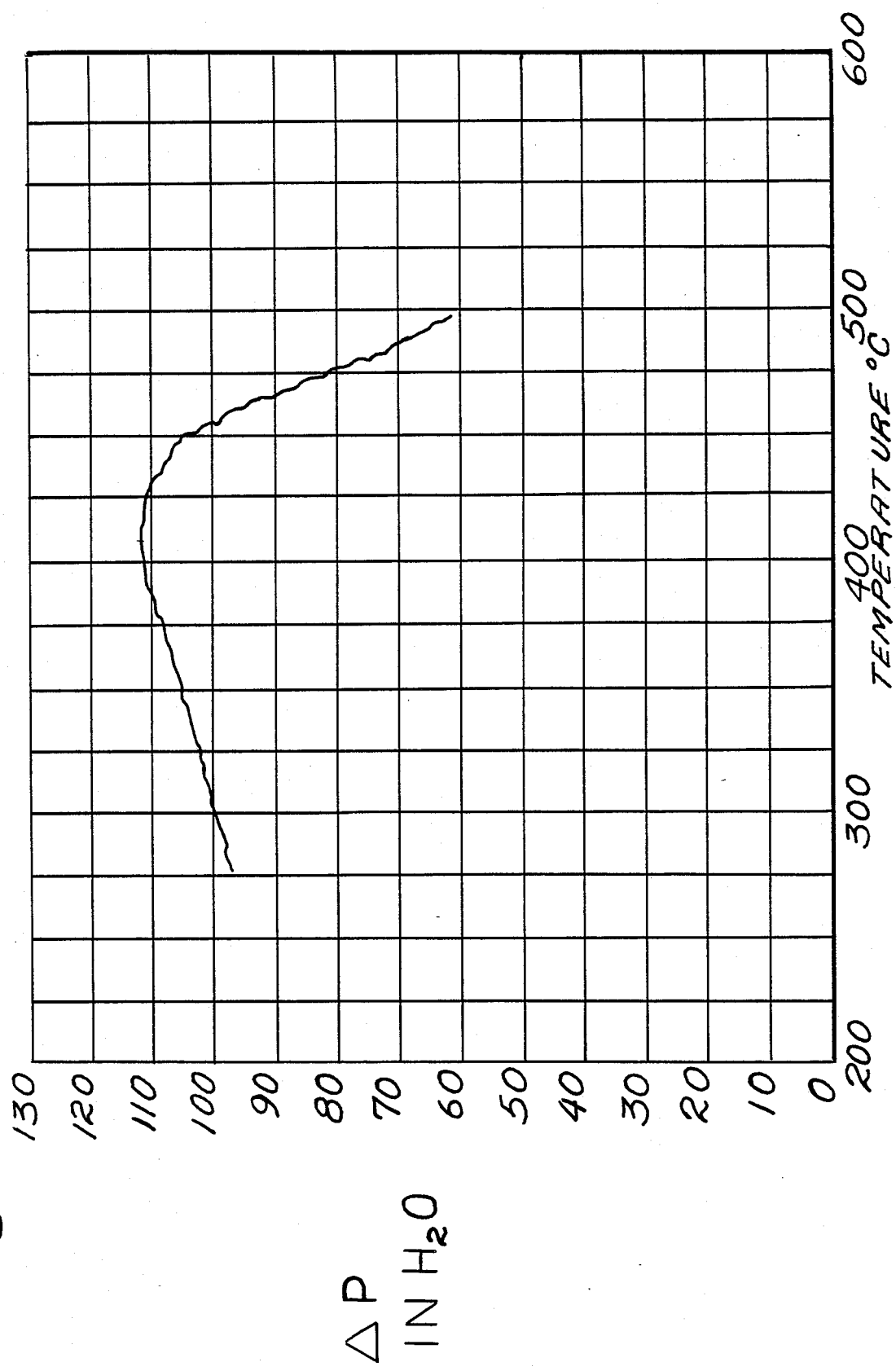
Figure 3:
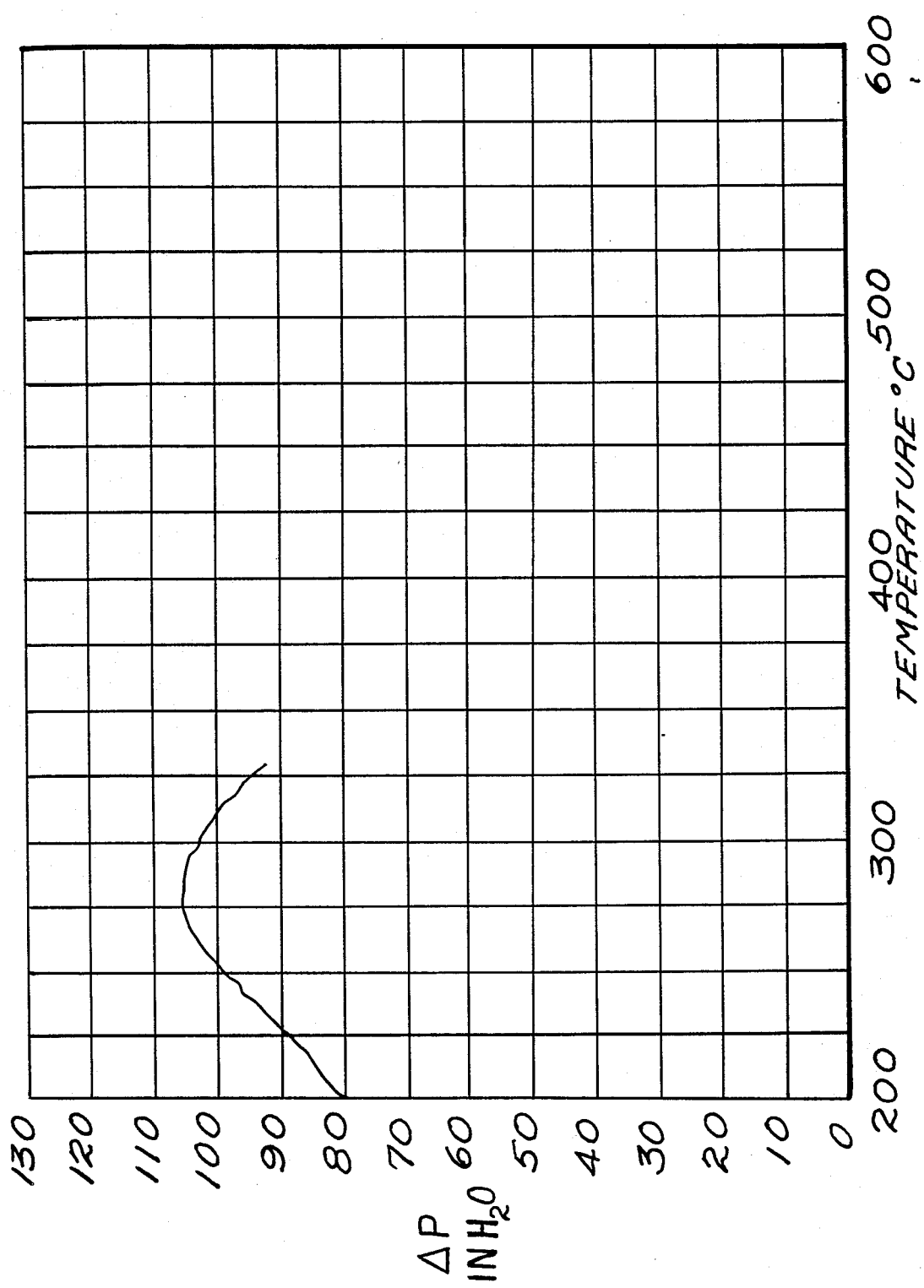

Results of the two balance tests are shown in FIGS. 2 and 3. As shown in the drawings, the trap alone (FIG. 2) gave a balance temperature of 410° C. whereas the platinum monolith plus trap system (FIG. 3) produced a balance temperature of 275° C. These tests demonstrate the feasibility of separating the catalyst from the diesel particulate filter contemplated herein. These tests also verify the SCAT results and further demonstrate that the invention is functional in a diesel exhaust environment. This system may be further improved by incorporating a catalyst (precious metal, base metal, or other) on the surface of the filter media.

EXAMPLE 4

Example 3 was repeated except that the filters were exchanged as follows:
a. no Pt monolith catalyst was used upstream of a Pt catalyzed filter;
b. Pt monolith catalyst was used upstream of an alumina coated filter; and
c. Pt monolith catalyst was used upstream of a La/Cs/$V_2O_5$ coated filter.

The engine was then run over a series of steady state tests and rates of increase (+) or decrease (−) of pressure drop across the filter measured at various filter inlet temperatures with the following results:

| Filter Inlet °C. | Rate of Pressure Change (in H₂O/hr.) | | |
|---|---|---|---|
| | System (a) | System (b) | System (c) |
| 225 | +30 | +10 | +8 |
| 275 | +14 | +5 | +10 |
| 300 | −6 | −7 | +1 |
| 400 | −15 | −5 | −9 |
| 450 | −10 | +3 | −20 |

In addition, balance temperatures and emissions of $H_2SO_4$, measured at 450° C. for the three systems gave the following results:

| System | Balance Temp. °C. | $H_2SO_4$ mg/ft³ |
|---|---|---|
| a | 270° C. | 4.6 |
| b | 245° C. | 1.3 |
| c | 280° C. | 2.8 |

The results obtained show that the combination of a Pt catalyzed monolith to generate $NO_2$ upstream of a base metal catalyzed particulate filter gives an excellent combination of (a) low balance temperature, (b) low rate of pressure increased across the filter at low temperatures, and high rates of pressure decrease at high temperatures, and (c) reduction of sulphuric acid emissions below the levels obtained with a Pt catalyzed filter.

As noted earlier, it is believed that the presence of $H_2O$, by its addition to the gas or by its inherent presence under the conditions used, results in the production of $HNO_3$ in the exhaust gas. In the manufacture of activated carbon, nitric acid is commonly used to oxidize and burn off carbon and it appears that the $HNO_3$, formed in the exhaust gas prior to the filter by reaction between the catalytically generated $NO_2$ and water vapor, may function in a similar way in the present case to facilitate ignition and removal of carbon soots or like particulate collected on the filter.

While the invention contemplates the use of catalytically generated $NO_2$ to form $HNO_3$, it is also possible, as a further modification, to supply $HNO_3$ to the filter in other ways, e.g., by controlled nitric acid injection into the filter or into the exhaust gas before it reaches the filter.

Other modifications in the invention are also contemplated. For example, as an alternative to the catalytic conversion of NO in the diesel exhaust to $NO_2$ for diesel soot removal, it is possible to use a metal nitrate which decomposes at a temperature close to the required diesel soot combustion temperature to provide the diesel $NO_2$. Representative nitrates which may be mentioned for this purpose include potassium nitrate, magnesium nitrate, bismuth nitrate, lead nitrate. It appears that metal nitrates which decompose at temperatures of up to about 470° C. can be used to supply $NO_2$ at a temperature near 300° C. so as to effectively oxidize diesel soot.

It will be appreciated from the foregoing that the invention involves in its preferred embodiment, the catalytic generation of the oxidant $NO_2$ which is carried downstream to a filter on which diesel particulate is entrapped whereupon the oxidant attacks and combusts the particulate and thereby reduces the pressure drop across the filter. The filter also acts as a trap for any sulfate which is generated so as to reduce sulfate emissions. The filter may also include a high temperature catalyst to facilitate combustion above 300° C. As another alternative, the filter may be provided with a catalyst to catalytically generate oxidant $NO_2$ in situ with the particulate. Preferably, however, the $NO_2$ generating catalyst is positioned upstream from the filter to minimize fouling the $NO_2$ generation catalyst by diesel particulate.

As will be recognized, the invention offers a number of advantages and particularly the possibility of effectively removing carbonaceous particulate deposits from the filter in a diesel exhaust gas system at low temperatures. However, a further advantage is that the present process permits effective NO removal from the exhaust gas. It was not previously considered possible to effectively lower NO content in a diesel exhaust gas without increasing particulate deposit. The invention provides means for reducing both NO content in the gas and carbon deposit on the filter.

Figure 4:
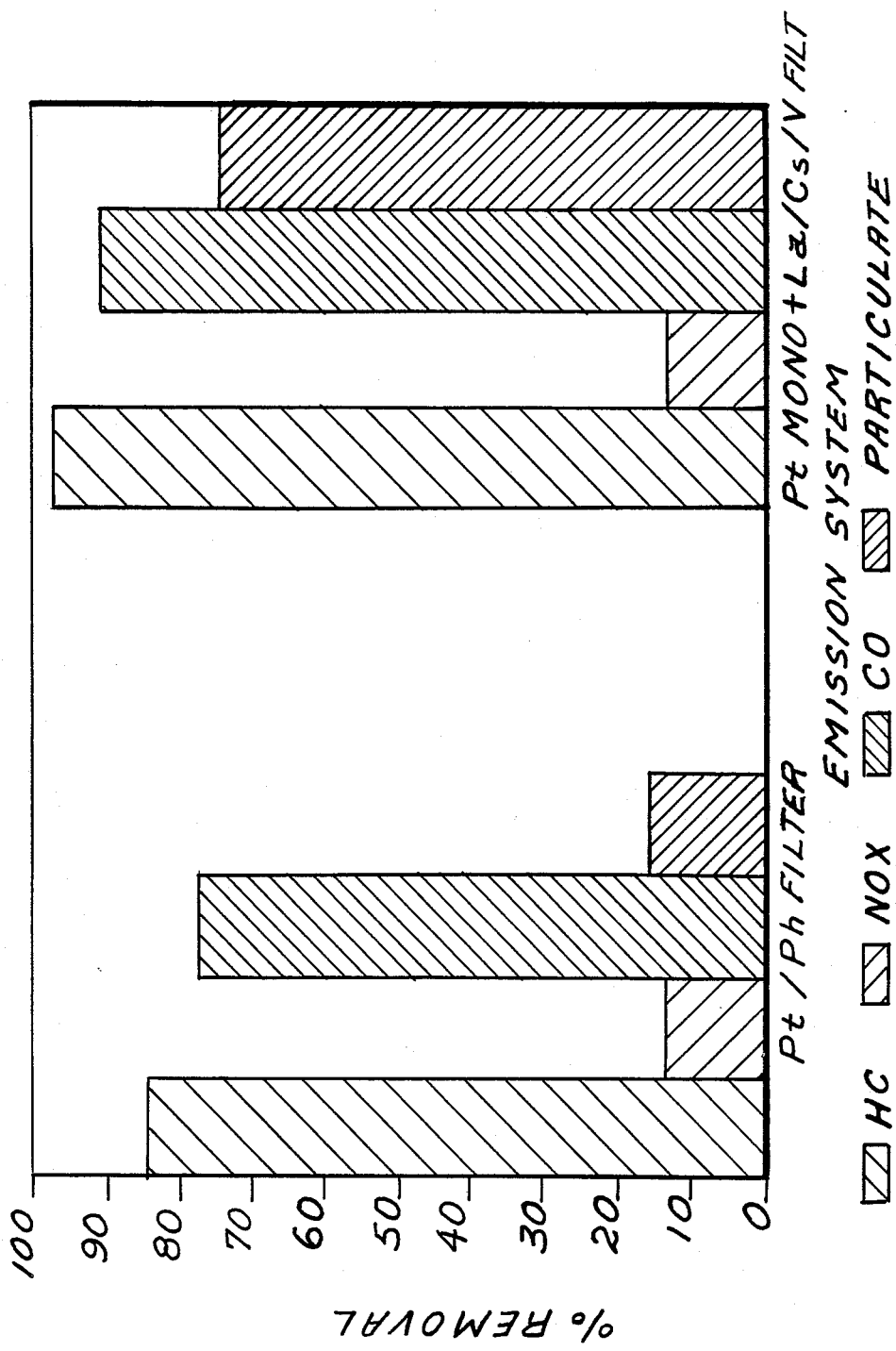

FIG. 4 graphically shows that the present process provides both particulate and NO removal as well as reduced CO and hydrocarbon emission. The results shown in FIG. 4 were generated with a Pt-catalyzed metal monolith followed by a La/Cs/$V_2O_5$ wire mesh trap using a Cummins' L10 Heavy Duty Diesel Engine. Specific data for the test system was as follows:

| Engine capacity | 10 liters |
|---|---|
| Monolith Volume | 825 cu. in containing 38 g Pt |
| Trap Volume | 49 annular wire mesh blocks 4¼ o.d., 2¼" i.d. × 3" long. |

These results were compared to those obtained with a similar system, but with no Pt monolith and with the trap catalyzed with a 35% Rh/Pt catalyst. The system of the invention showed lower CO, HC and particulate removal, with about the same level of NO removal.

The results illustrated in FIG. 4 were obtained over the Federal Test Procedure for Heavy Duty Engines on a transient test bed.

It will be recognized that some removal of particulate occurs via NO→$NO_2$ generation over the monolith itself. However, use of the particulate filter or trap after the monolith provides increased residence time and hence increased efficiency.

Figure 5:
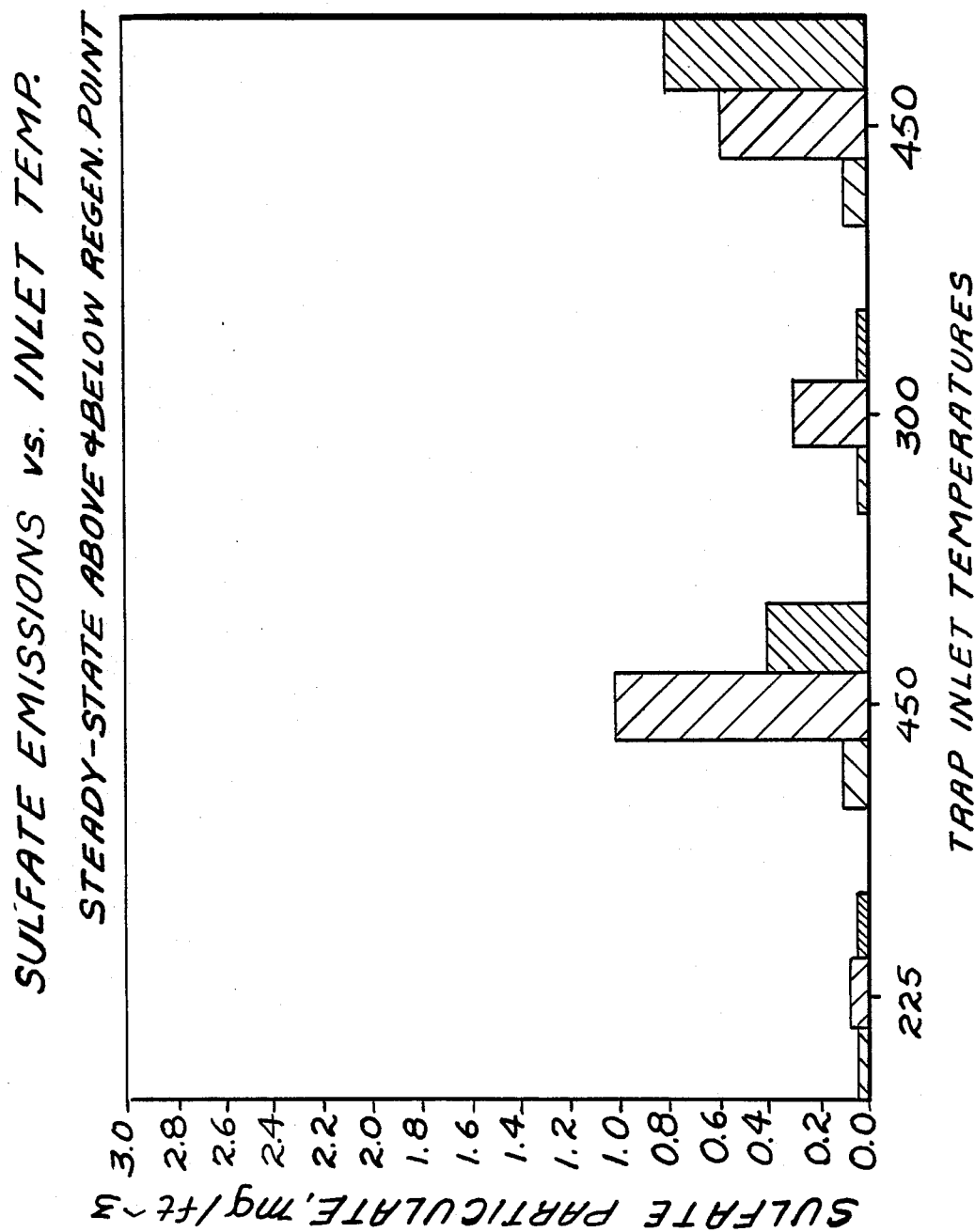

FIG. 5 graphically shows the effect of the trap in reducing $H_2SO_4$ emission. The results shown were obtained by processing exhaust gas successively over the Pt monolith and La/Cs/$V_2O_5$ wire mesh measured at 225° C., 450° C., 300° C. and again at 450° C. The experiment was conducted, as in Example 3, on the Peugeot engine with the exhaust temperatures held at each of these points. At 225° C., the trap was below the balance temperature and was accumulating particulate. At this low temperature, the engine was producing very little sulfate. After the monolith, the sulfate content increased slightly, but after the trap, the sulfate level was lower. On increasing the exhaust temperature to 450° C., the engine sulfate increased slightly, and there was a dramatic increase in sulfate over the monolith, but again the sulfate level after the trap was reduced. In this condition, the trap was starting to regenerate.

Upon setting the engine exhaust to 300° C. (above regeneration temperature), a similar pattern of results was seen with lower sulfate emission after the trap than after the monolith. The engine exhaust was then increased to 450° C. and the trap fully cleaned. In this case, the emissions after the trap were somewhat higher than after the monolith probably due to saturation of the traps sulfate removal capability. Alternatively, there could possibly be a reaction between the particulate on the trap and sulfate causing removal or conversion of sulfate to $SO_2$, and if the trap reaches a fully clean state then no particulate remains to meet with the sulfate.

Various modifications may be made in the invention. Accordingly, the scope of the claims is defined in the following claims wherein:

We claim:

1. In a process wherein diesel exhaust gas is passed through a filter to remove particulate therefrom before discharge and particulate deposited on the filter is combusted, the improvement which comprises combusting the particulate with a gas containing $NO_2$.

2. The process of claim 1 wherein the gas containing $NO_2$ also includes water vapor.

3. The process of claim 2 wherein the particulate is combusted at a temperature below 400° C.

4. The process of claim 3 wherein the gas containing $NO_2$ is provided by initially passing diesel exhaust gas containing NO over a catalyst to convert the NO to $NO_2$.

5. The process of claim 4 wherein the catalyst comprises a platinum group metal.

6. The process of claim 5 wherein the catalyst comprises a platinum group metal on a monolithic honeycomb.

7. The process of claim 6 wherein the filter includes a catalyst which facilitates particulate combustion.

8. The process of claim 7 wherein the filter catalyst comprises a base metal.

9. The process of claim 7 wherein the fliter catalyst comprises a combination of lanthanum, cesium and vanadium pentoxide.

* * * * *